(12) United States Patent  
Accoto et al.

(10) Patent No.: US 7,422,191 B2
(45) Date of Patent: Sep. 9, 2008

(54) BISTABLE MINIATURE VALVE

(75) Inventors: Dino Accoto, Andrano (IT); Friedrich B. Prinz, Woodside, CA (US); Tibor Fabian, Mountain View, CA (US); WonHyoung Ryu, Stanford, CA (US); Jun Sasahara, Saitama (JP); Hideaki Tsuru, Columbus, OH (US); Georg Brasseur, Vienna (AT)

(73) Assignees: The Board of Trustees of the Leland Stanford Junior University, Palo Alto, CA (US); Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 11/151,158

(22) Filed: Jun. 10, 2005

(65) Prior Publication Data

US 2006/0017534 A1 Jan. 26, 2006

Related U.S. Application Data

(60) Provisional application No. 60/579,789, filed on Jun. 14, 2004.

(51) Int. Cl.
*F16K 31/00* (2006.01)
*F16K 31/18* (2006.01)
(52) U.S. Cl. .................... 251/11; 251/129.01
(58) Field of Classification Search ............ 251/129.01, 251/129.15, 11
See application file for complete search history.

(56) References Cited

U.S. PATENT DOCUMENTS

| | | | |
|---|---|---|---|
| 5,050,838 A | 9/1991 | Beatty et al. | 251/11 |
| 5,971,355 A * | 10/1999 | Biegelsen et al. | 251/129.06 |
| 6,123,316 A * | 9/2000 | Biegelsen et al. | 251/129.01 |
| 6,168,395 B1 | 1/2001 | Quenzer et al. | 417/413.3 |
| 6,340,176 B1 | 1/2002 | Webber et al. | 280/806 |
| 6,438,810 B2 | 8/2002 | Rogers, Jr. et al. | 24/641 |
| 6,513,747 B1 | 2/2003 | Lee et al. | 242/374 |
| 6,572,147 B2 | 6/2003 | Webber et al. | 280/806 |
| 6,598,621 B1 * | 7/2003 | Wygnanski | 137/624.18 |
| 6,725,509 B1 | 4/2004 | Lee et al. | 24/641 |
| 6,828,887 B2 | 12/2004 | Kubby et al. | 335/78 |

* cited by examiner

*Primary Examiner*—John K Fristoe, Jr.
(74) *Attorney, Agent, or Firm*—Lumen Patent Firm, Inc.

(57) ABSTRACT

A bistable minivalve includes a movable component, an actuator that is electrostatically, magnetically, or mechanically coupled to the movable component for controllably switching the movable component between open and closed states, and a casing providing structural support. The movable component has an actuation surface [300] movably positioned in the valve conduit and a bistable element attached to the actuation surface providing mechanical stability to the open and closed states of the movable component. The bistable element may be realized as a pair of elastic buckling beams [302, 304] attached at their midpoints to opposite sides of the actuation surface. Optionally, there may also be elastic support beams [306, 308] attached at their endpoints to the actuation surface and attached at their midpoints to the elastic buckling beams.

21 Claims, 6 Drawing Sheets

BISTABLE MINIATURE VALVE

CROSS-REFERENCE TO RELATED APPLICATIONS

This application claims priority from U.S. provisional patent application No. 60/579,789 filed Jun. 14, 2004, which is incorporated herein by reference.

FIELD OF THE INVENTION

The present invention relates generally to miniature switching devices and more particularly to bistable miniature valves for fluid flow control.

BACKGROUND OF THE INVENTION

Fluidic valves are used in a variety of applications to control flow rates and pressures of liquids and gases. The development of miniature devices has created a demand for a small scale and energy-efficient fluidic valves. Some known valve designs, such as the heated diaphragm valve and shape memory alloy (SMA) valves, require continuous energy input to maintain either an open or closed state. Bistable valve designs, in contrast, are energetically stable in both open and closed states and require energy input only for switching between states. Known bistable valve designs include, for example, electrochemically actuated microvalves and buckled beam microvalves. Electrochemically actuated microvalves suffer from low switching rates. Buckled beam microvalve designs are limited to very small scales due to the fact that the buckling structure is the actuation surface. Consequently, buckled beam microvalves are suitable for use only when flow rates are very small. Conventional mechanical valves using a linear or rotary motor for an actuator can handle large fluid rates, but can be difficult to miniaturize, have limited switching rates, and can be complicated to manufacture.

SUMMARY OF THE INVENTION

The present invention provides a miniature valve with reduced energy consumption during operation. The solution is realized in a bistable miniature valve that is stable in both open and closed state and consumes power only during switching from one state to the other. The device can be operated using either electrostatic or electromagnetic actuator. Because of low energy consumption for operation, the invention is particularly useful and advantageous for operating a mobile device which requires a fluid control, for instance, a micro fuel cell.

In one aspect, the invention provides a bistable minivalve that includes a conduit for carrying a fluid, a movable component having an open state allowing fluid flow through the conduit and a closed state blocking fluid flow through the conduit, an actuator coupled to the movable component for controllably switching the movable component between the open state and the closed state, and a casing providing structural support for the conduit, the movable component, and the actuator. The movable component has an actuation surface movably positioned in the conduit and a bistable element attached to the actuation surface providing mechanical stability to the open and closed states of the movable component. In some embodiments, a sealing element may be attached to the actuation surface or to the casing near a valve outlet orifice of the conduit. The actuation surface may be formed as a membrane having a thickness of less than 100 micrometers. The actuator may be electrostatically, magnetically, or mechanically coupled to the movable component to induce changes between the open state and the closed state. In the case of magnetic coupling, the actuation surface and the actuator have magnetic elements such as an electromagnet or magnetic material. In the case of electrostatic coupling, the actuation surface and the actuator have conductive elements such as planar electrodes. In a preferred embodiment, the bistable element is realized as a pair of elastic buckling beams attached at their midpoints to opposite sides of the actuation surface. Optionally, there may also be elastic support beams attached at their endpoints to the actuation surface and attached at their midpoints to the elastic buckling beams. Buckling of the buckling beams may be induced by various techniques including the use of compressed C-clamps that bend or compress the buckling beams, forming the buckling beams using two material layers inducing buckling by shear stress between the layers, or bonding each of the buckling beams near its endpoints to a substrate to induce buckling.

DETAILED DESCRIPTION

Figure 1:
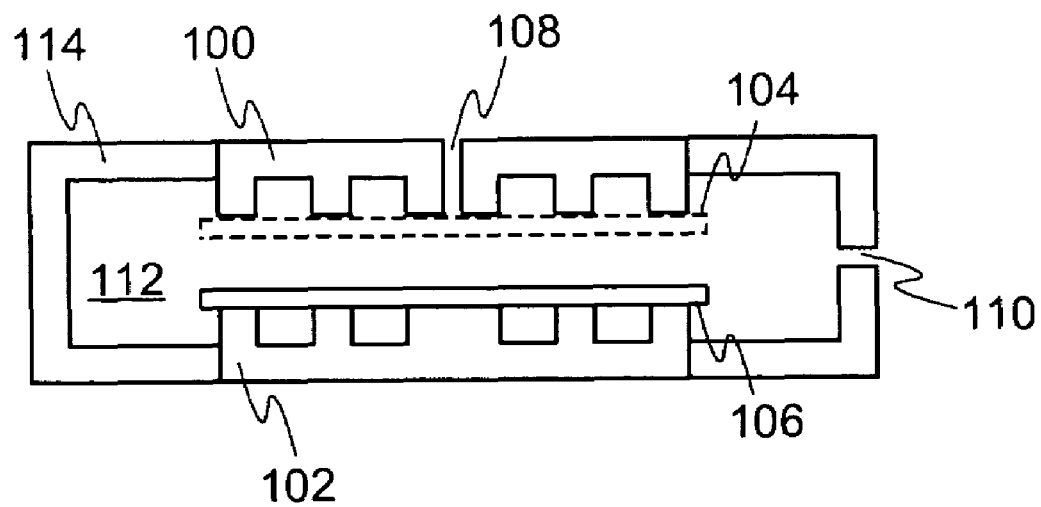
FIG. 1 is a cross-sectional diagram of a miniature valve configuration with an electromagnetic actuator.

FIG. 1 is a side-cross-sectional view of a bistable miniature valve according to a first embodiment of the invention. An electromagnetic actuator comprising an upper electromagnet 100 and lower electromagnet 102 is magnetically coupled to a movable component which includes an actuation surface movably positioned between a closed state position 104 and an open state position 106 in a fluid conduit comprising an input orifice 110, a valve chamber 112, and an output orifice 108. A casing 114 provides structural support for the conduit, the movable component, and the actuator. In operation, when the actuator causes the actuation surface to be in the open state position 106, fluid freely flows into the valve through input orifice 110 and out of the valve through output orifice 108. When the actuator causes the actuation surface to be in the closed state position 104, the output orifice 108 is obstructed and fluid flow through the conduit is blocked. Thus the actuation surface serves as a flow control element for the device.

Figure 2:
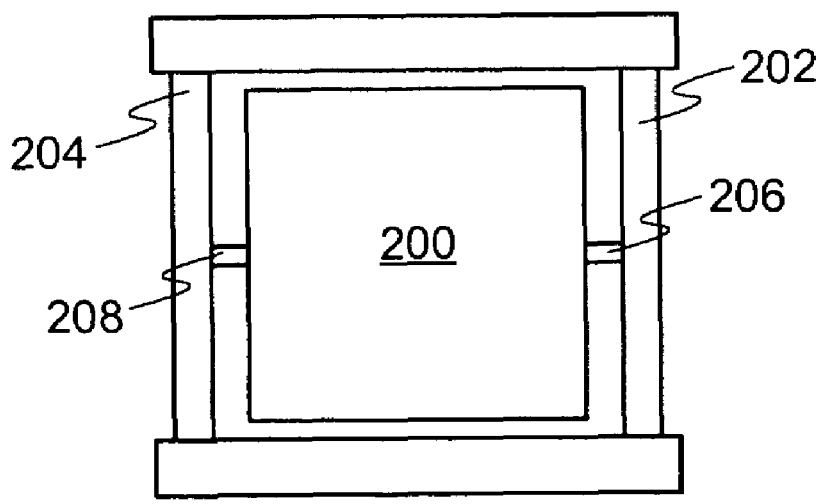
FIG. 2 illustrates a first membrane embodiment of a minivalve with an actuator surface and buckling beams.
Figure 3:
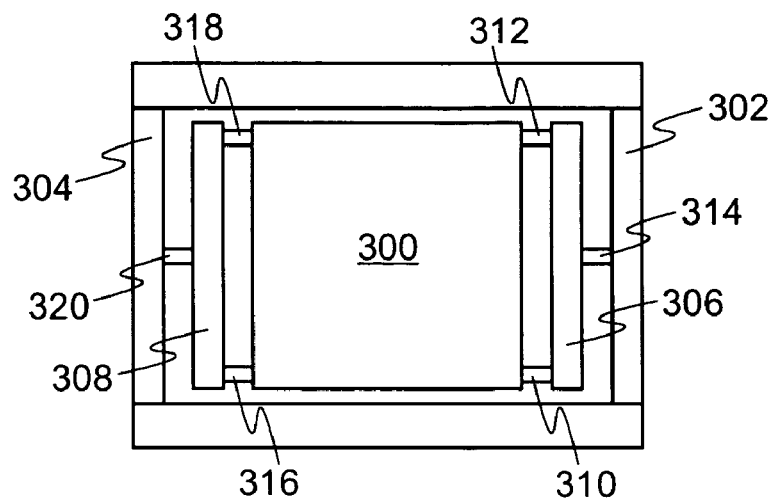
FIG. 3 illustrates a second membrane embodiment of a minivalve with an actuator surface, buckling beams, and elastic beams supporting the membrane.

The movable component described above is shown in more detail in the top-cross-sectional view of FIG. 2. The actuation surface 200 is attached to a bistable element comprising elastic buckling beams 202 and 204 which provide mechanical stability to the open and closed states. The bistable element is responsible for the bistable behavior of the device. The movable component of the device includes both the buckling beams 202 and 204 as well as the actuation surface 200. The two elastic buckling beams 202 and 204 are attached at their midpoints 206 and 208 to opposite sides of the actuation surface 200. In an alternate embodiment of the movable component shown in FIG. 3, the movable component includes an actuation surface 300, two buckling beams 302 and 304, and two elastic support beams 306 and 308. Elastic support beam 306 is attached at its endpoints 310 and 312 to the actuation surface 300 and attached at its midpoint 314 to elastic buckling beam 302. Similarly, elastic support beam 308 is attached at its endpoints 316 and 318 to the actuation surface 300 and attached at its midpoint 320 to elastic buckling beam 304. The elastic support beams 306 and 308 are optional and serve to provide mechanical support to the actuation surface 300. The movable element may be, for example, a thin membrane having a thickness of 100 micrometers or less. The two buckling beams, as well as the optional support beams, preferably have a narrow rectangular shape.

Figure 4:
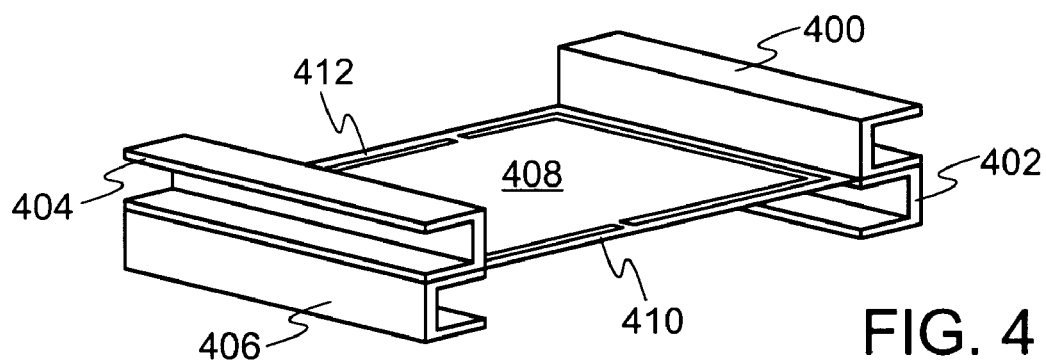
FIG. 4 illustrates a bistable valve structure using a C-shape clamp to induce buckling by bending.
Figure 5A:
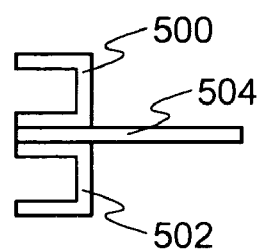
FIGS. 5A-B illustrate bistable behavior using a clamp structure to induce membrane buckling by compression.
Figure 5B:
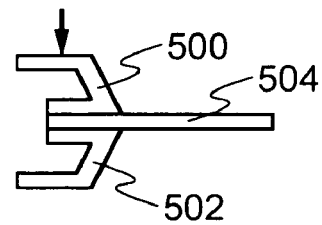
Figure 6A:
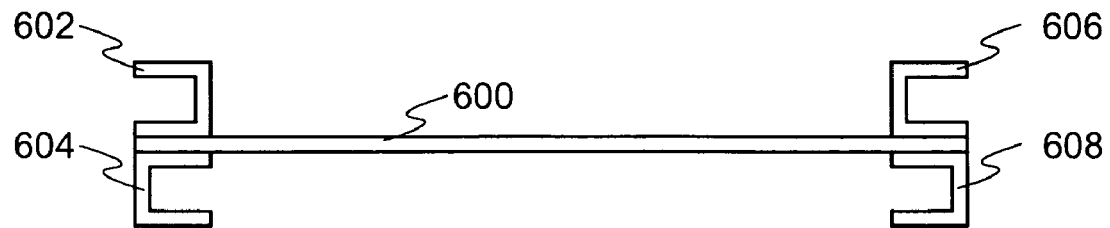
FIGS. 6A-B illustrate bistable behavior using a C-clamp configuration to induce bending force upon compression.
Figure 6B:
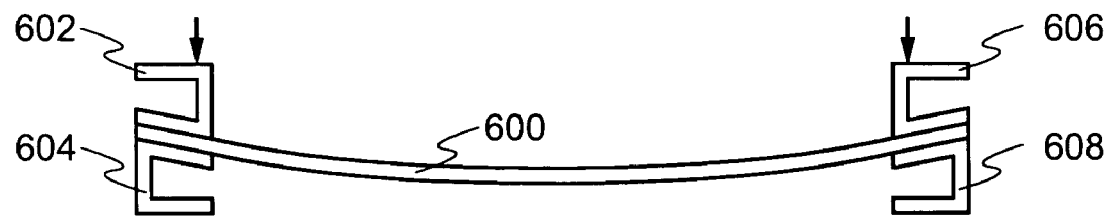
Figure 7:
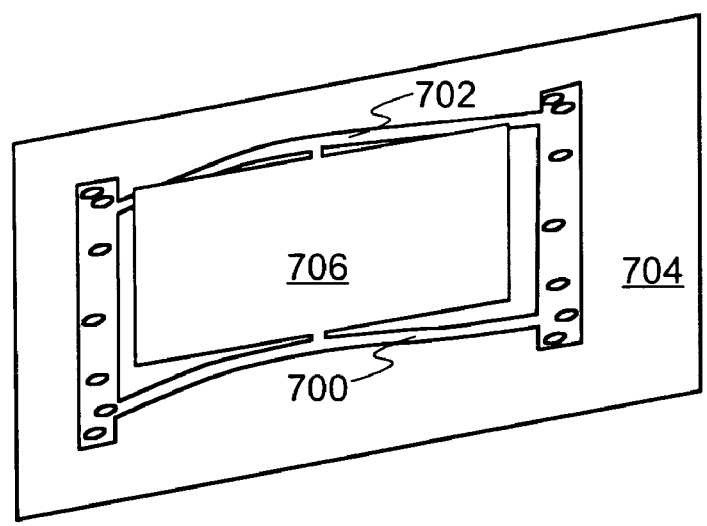
FIG. 7 shows a membrane buckled prior to assembly, microwelded to a substrate to induce buckling.

Due to the mechanical stability provided by the bistable element, the device is bistable, which in the context of this description is defined to mean that no energy or force is required to maintain the device in the open state or in the closed state. Energy or force is used, however, to switch the device between the two mechanically stable states. This bistable property may be provided, for example, by mechanically buckling the buckling beams during device assembly. FIG. 4 shows an isometric view of an exemplary movable element of a bistable minivalve with four C-shape clamps 400, 402, 404, 406 attached to opposite sides of membrane 408, one pair on each side with the edge of the membrane sandwiched between the pair of clamps. During assembly, buckling of the buckling beams 410 and 412 is induced with a compression force applied to the C-clamps, as illustrated in FIGS. 5A-B and 6A-B. FIGS. 5A-B shows cross-sectional views of a pair of C-clamps 500 and 502 with membrane 504 sandwiched between them. FIG. 5A shows the initial configuration with no compression force. During assembly, a compression force is applied, as shown in FIG. 5B, and the C-clamps are fixed in this compressed configuration, forcing the membrane to move laterally so that the membrane is buckled, thereby producing bistable behavior. If the C-clamps are oriented in opposite directions, as shown in FIGS. 6A-B, the compression force on the C-clamps 602, 604, 606, 608 produces a bending of the membrane 600 rather than a lateral movement, and this bending is another technique to produce buckling and bistable behavior. In yet another embodiment, the membrane is buckled to produce bistability by bonding (e.g., microwelding) the ends of buckling beams 700 and 702 to a support substrate 704, as shown in FIG. 7. The ends of buckling beams 700 and 702 are bonded at a distance less than their length when flat, so that buckling is induced. The induced buckling may take place in two ways, corresponding to the two states of the minivalve. In FIG. 7, the buckling is upward, so that the actuation surface 706 has a raised position. Preferably, four or more welding spots are used, one welding spot for each buckling beam. In another embodiment, the buckling of the buckling beams may be induced by a non-uniform shearing stress along a part or all of the length of the buckling beams, producing a tension along one of its surfaces. For example, a layer of a second material may be deposited on a primary material of the buckling beams, inducing a buckling of the beam. In light of the above examples, those skilled in the art will appreciate that various other techniques may also be used to create buckling and a desired bistable behavior.

Figure 8:
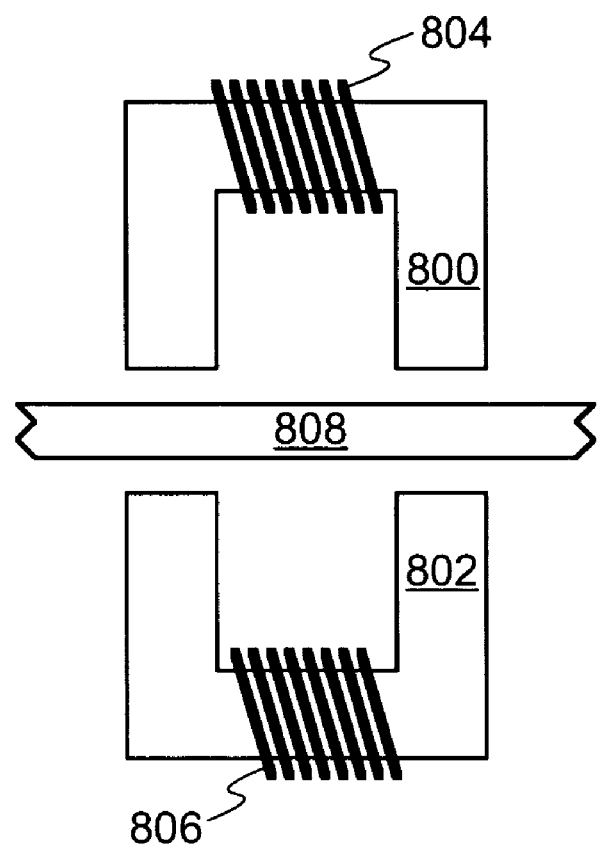
FIG. 8 is a schematic view of a magnetic circuit arrangement for membrane actuation using two coils.
Figure 9:
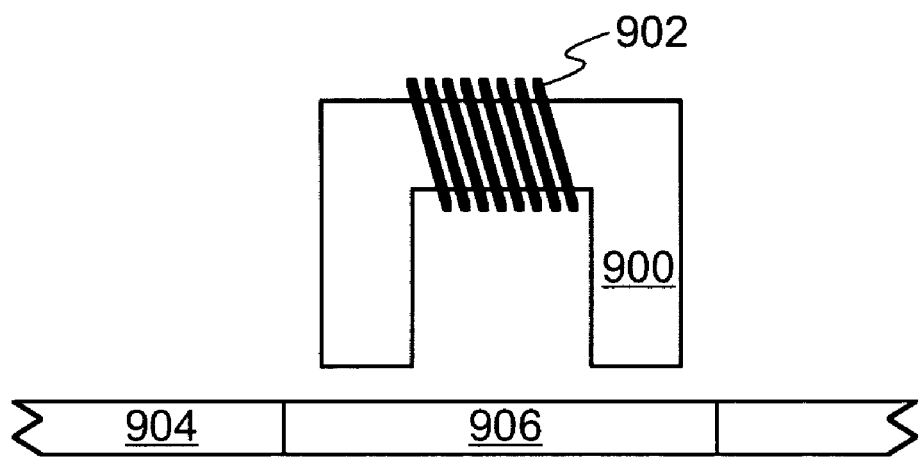
FIG. 9 is a schematic view of a magnetic circuit arrangement for membrane actuation using a single coil and remnant magnetization.
Figure 10:
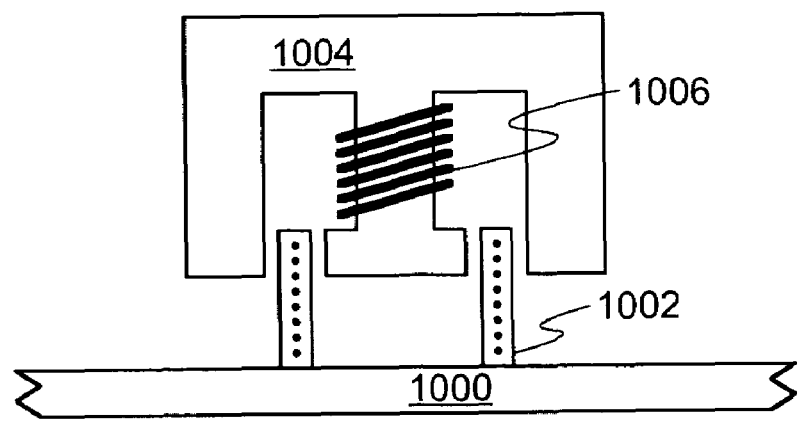
FIG. 10 is a schematic view of a magnetic circuit arrangement for membrane actuation using a membrane coil.
Figure 12:
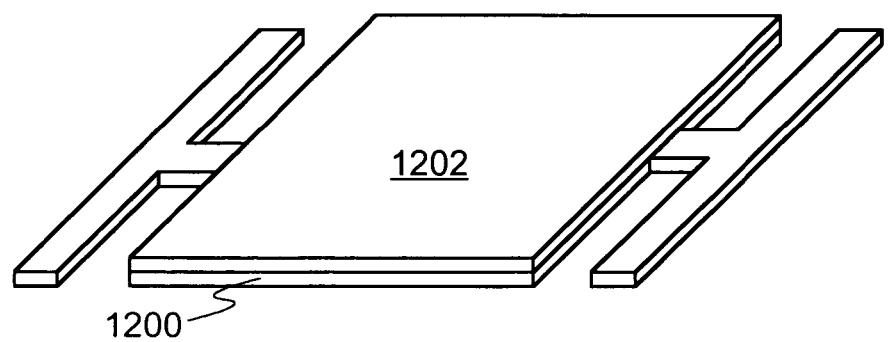
FIG. 12 illustrates a composite membrane having a support layer for facilitating buckled beam operation and an add-on layer with beneficial magnetic properties.

Various actuator designs and mechanisms may be used to switch between the open and closed states. Generally, an actuator performs the switching by exerting a force upon all or part of the movable element. The force may be applied to the actuation surface, to the bistable element, or to both. The force may be mechanical, electrostatic, magnetic, electromagnetic, or another type of force. For example, FIG. 8 is a cross-sectional diagram illustrating a first embodiment of a magnetic actuator comprising two electromagnets. A first electromagnet comprises an armature 800 and conductive coil 804, while a second electromagnet comprises an armature 802 and conductive coil 806. The two electromagnets are positioned above and below the movable element membrane 808. The membrane 808 is, contains, or is attached to a ferrimagnetic or ferromagnetic material so that activation of the first or second electromagnet will result in a magnetic force upon the membrane (i.e., upon the buckling beams, actuation surface, or both). When the first electromagnet is activated, a first force (e.g., upward) causes the movable component to switch from the first state to the second state, while activation of the second electromagnet creates a second force (e.g., downward) that switches the movable component from the second state to the first state. Because each state is stable, the electromagnets need only be activated for switching. If a ferromagnetic material is used, then a single electromagnet may suffice for the actuator, as illustrated in FIG. 9. The membrane 904 in this example contains a ferromagnetic region 906. Armature 900 with conductive coil 902 is positioned sufficiently close to magnetized region 906 so that activation of the electromagnet gives rise to a force upon the membrane. By reversing the direction (i.e., polarity) of current through coil 902, the force is either in a first direction (e.g., attraction upward) or a second direction (e.g., repulsion downward). As an alternative to the above embodiments, in cases where it may be preferable to fabricate membrane 904 of a material that does not have suitable magnetic properties, a layer having beneficial magnetic properties may attached to the membrane (e.g., by deposition of a ferrimagnetic or ferromagnetic material upon the membrane). For example, FIG. 12 shows a membrane comprising a primary membrane layer 1200 composed of a first material having suitable elastic properties for mechanical bistability and a secondary deposition layer 1202 composed of a second material having desired ferrimagnetic or ferromagnetic properties. In yet another embodiment, illustrated in FIG. 10, the membrane 1000 is attached to a conductive membrane coil 1002 designed to magnetically interact with an electromagnet comprising an armature 1004 and actuator coil 1006. Membrane coil 1002, for example, may be positioned near the center of the actuation surface. When a first current flows through actuator coil 1006 and a second current flows through membrane coil 1002, the interaction of the induced magnetic fields from the two coils produces a force between the membrane and electromagnet. The direction of the force depends upon the relative directions of the two currents. Thus, by reversing the direction of one of the two currents, the direction of the force is reversed, allowing switching between the two states. In a variation of this embodiment, the actuator electromagnet can be replaced by a permanent magnet, and switching is controlled by the membrane coil current. In other embodiments, any of the electromagnets described above may be implemented as one or more planar coils, e.g., fabricated on a surface using printed circuit board techniques. In the magnetic actuator embodiments described above, the amplitude of the current is preferably selected to ensure that sufficient force is provided to overcome the mechanical stability of the bistable element and switch from one state to the other.

Figure 11A:
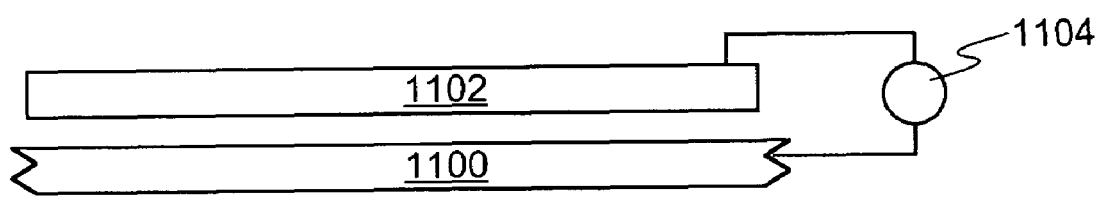
FIGS. 11A and 11B are schematic drawings of a single-plate and double-plate electrostatic actuation arrangements.
Figure 11B:
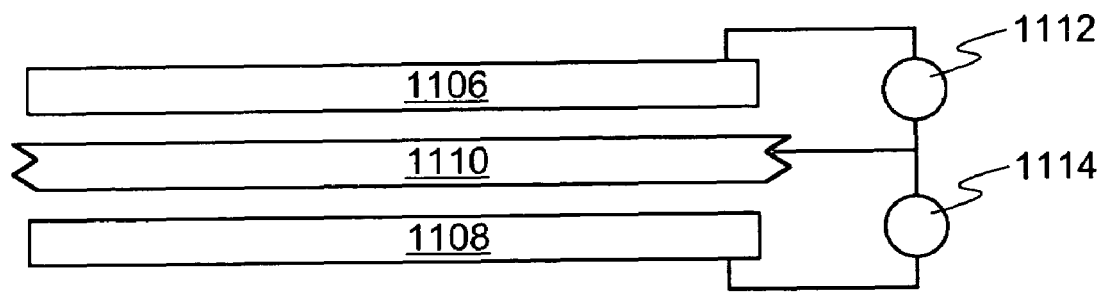

In other embodiments, electrostatic forces are used to switch between the two states. The electrostatic forces are preferably created by establishing an electrostatic charge at the membrane and at one or more electrodes. For example, FIG. 11 is a schematic diagram illustrating a conductive membrane 1100, an electrode 1102 whose surface is parallel to the membrane, and a voltage generator 1104. When the voltage generator produces charges of the same polarity on the membrane 1100 and electrode 1102, a repulsive (downward) electrostatic force results. When the voltage generator 1104 produces charges of opposite polarity, an attractive (upward) force results. Thus, by controlling the amplitude and polarity of the voltages applied to the membrane 1100 and electrode 1102, the switching between the two states is performed. Alternatively, as shown in FIG. 11B, it is also possible to use two parallel electrodes 1106 and 1108 positioned above and below membrane 1110 to produce the electrostatic forces upon the membrane in two different directions. Two voltage generators 1112 and 1114 control the electrostatic charges on the electrodes. The two electrodes can be activated at separate times (i.e., one used alone for switching to the open state, and the other used alone for switching to the closed state) or they can be activated together but with opposite polarity (i.e., so that one attracts the membrane while the other simultaneously repels it). In the latter case, the voltage polarities are reversed to reverse the switching direction. In the above electrostatic actuator embodiments, membrane 1100 may be composed in whole or in part of a conductive material, or it may be attached to a conductive material (e.g., by deposition of a conductive material upon the membrane). The amplitude of the voltage is selected to create sufficient electrostatic force to overcome the mechanical stability of the bistable element. It should be emphasized again that the force need only be applied during switching. Once in the open state or closed state, no force need be applied.

Those skilled in the art will appreciate that other types of forces other than magnetic and electrostatic can be used to induce a change in state of the movable component. For example, the actuator may apply mechanical forces by direct mechanical contact with the movable component to induce change of state.

Figure 13A:
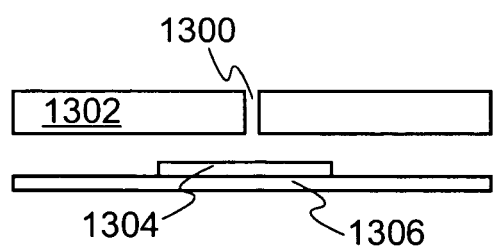
FIGS. 13A-D are schematic views of four sealing configurations: compliant layer on the membrane, compliant material around the outlet orifice, O-ring in the armature, and conical/spherical element on the membrane and matching surface.
Figure 13B:
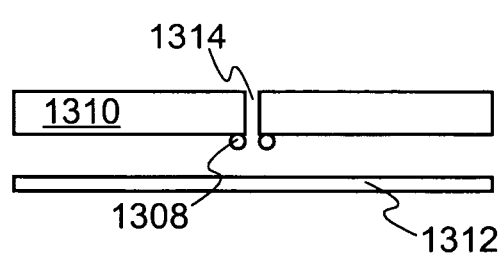
Figure 13C:
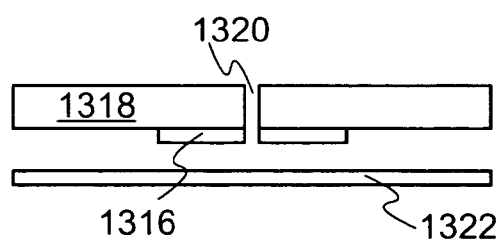
Figure 13D:
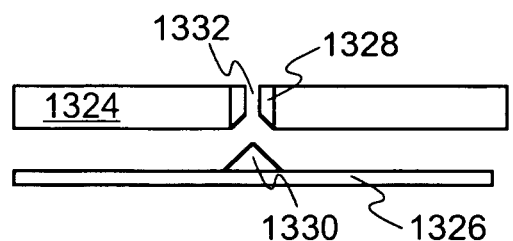

In some embodiments of the invention, the movable component membrane and/or the valve outlet orifice are provided with features and/or sealing element(s) to enhance conduit sealing when the device is in the closed state. For example, FIG. 13A is a cross-sectional diagram showing an outlet orifice 1300 of the valve conduit formed as a hole in the valve casing material 1302. A compliant layer 1304 attached to the membrane actuation surface 1306 serves as a sealing element. FIG. 13A illustrates the open state of the movable component. In the closed state, actuation surface 1306 and attached sealing element 1304 is positioned upward so that sealing element 1304 blocks outlet orifice 1300. Alternatively, as shown in FIG. 13B, a sealing element such as O-ring 1308 may be attached to the casing material 1310 around outlet orifice 1314 so that when membrane 1312 moves upward into a closed state, the O-ring 1308 provides a seal to prevent fluid from flowing through outlet orifice 1314. FIG. 13C shows a similar embodiment in which a seating element 1316 is formed as a compliant layer with an orifice attached to casing material 1318 with its orifice aligned with outlet orifice 1320. The sealing element 1316 forms a seal with membrane 1322 when the membrane moves up against it in the closed state. In yet another embodiment, the sealing element comprises components on both the movable membrane 1326 and the casing 1324. In this example, the sealing element has a conical plug component 1330 attached to the membrane 1326 and a orifice component 1328 fitted to the orifice 1332. The two components 1328 and 1330 are designed to fit each other to form a fluidic seal when the membrane 1326 is positioned in the closed state. In all the above embodiments of sealing elements, the purpose of the sealing element is to reduce or minimize the leakage of fluid through the output orifice when the valve is in the closed state.

The minivalves described in the various embodiments above may be fabricated by various well-known layer-manufacturing (LM) processes such as semiconductor and print circuit board (PCB) techniques: molding, curing, bonding, electroplating, electroless plating, sputtering, etching, cutting, laser-cutting, drilling, etc. The movable component preferably is composed of a metal, polymer or composite material. In the case of magnetic actuation, the movable material is preferably made from a soft magnetic material characterized by high magnetic permeability, high saturation magnetization, and low intrinsic coercitivity. For example, suitable materials are Ni—Fe alloys such as Hy-Mu 80. Although the casing is typically part of the magnetic circuit, it is exposed to order of magnitude smaller magnetic flux and thus can be made from common soft magnetic materials preferably with good structural properties, i.e., high Young's modulus and high yield strength, such as Fe—Si alloys. In the case of electrical actuation, the movable part can be made of any conductive material, e.g. copper, nickel, aluminum, doped silicone, etc. The casing is preferably made of a non-conductive material with sufficient dielectric strength to avoid electric breakdown, e.g., fiber-reinforced epoxy, capton, polyacrylic, or PVC. The sealing material is preferably made from an elastomer with low wearability, good corrosion resistance and wide range of hardness. The sealing layer on the membrane facilitates the tightening of the seal when it is closed. Such a sealing capability is an important feature for safe operation, especially when the fluid is gaseous with low molecule weight. Very thin sealing layers made of, for example, ultraviolet (UV)-curable silicone rubber, can be spin-coated on the membrane, which is also a part of the LM process mentioned above.

It should be noted that the miniature valve designs described above have a bistable element (e.g., buckling beam) that is distinct from the actuation surface and also distinct from the casing. As one skilled in the art will appreciate, a bistable structure has two stable states of mechanical equilibrium. In the miniature valve, such positions correspond to the open state and the closed state. Since the actuator has no need to be excited during either open state or close state, the valve is energy efficient. In addition, the minivalves of the present invention have high switching velocity as compared to other known valves.

Of the many possible practical applications, the present invention is particularly useful in a small-scale fuel cell. Due to the established 2D patterning capability in sub-millimeter range, layer manufacturing (LM) processes such as semiconductor and print circuit board (PCB) technology are attractive in fabricating the fuel cell. The bistable miniature valve disclosed herein also may be fabricated using the LM process. Consequently, it can be cost-effectively and readily incorporated as a part of the same fabrication process for a small-scale fuel cell.

Moreover, for electromagnetic actuation, the PCB technology also helps to make a flat and thin coil for magnetic excitation. Compared with solenoid-type magnetic actuator, the present system can be packaged in simple and compact shape, and can achieve higher forces at smaller currents.

As one of ordinary skill in the art will appreciate, various changes, substitutions, modifications, and alterations could be made or otherwise implemented without departing from the principles of the present invention. For example, the invention is not limited by the type of actuation force, the type of fluid, the material composition of the elastic part, the material and shape of the sealing structure integrated on top of the membrane, or the material and shape of packaging, including fluidic parts, mechanic and electro-fluidic connectors.

Accordingly, the present invention should not be construed as being limited to or defined by what is shown or described herein. Moreover, known methods, procedures, systems, elements, or components may be discussed without giving details, so to avoid obscuring the principles of the invention. As one skilled in art will understand, the drawings disclosed hereinafter illustrate the preferred embodiments of the present invention and are not to be construed as limiting the present invention.

The invention claimed is:

1. A bistable minivalve comprising:
   a conduit for carrying a fluid;
   a movable component having an open state allowing fluid flow through the conduit and a closed state blocking fluid flow through the conduit;
   an actuator coupled to the movable component for controllably switching the movable component between the open state and the closed state; and
   a casing providing structural support for the conduit, the movable component, and the actuator;
   wherein the movable component comprises:
   an actuation surface movably positioned in the conduit; and
   a bistable element attached to the actuation surface providing mechanical stability to the open and closed states of the movable component;
   wherein the bistable element comprises elastic buckling beams attached to opposite sides of the actuation surface;
   wherein the movable component comprises elastic support beams attached at their endpoints to the actuation surface and attached at their midpoints to the elastic buckling beams.

2. The bistable minivalve of claim 1 wherein each of the buckling beams is bonded near endpoints to a substrate to induce buckling.

3. The bistable minivalve of claim 1 wherein the elastic buckling beams are attached at their midpoints to opposite sides of the actuation surface.

4. The bistable minivalve of claim 1 wherein the movable component comprises a sealing element attached to the actuation surface.

5. The bistable minivalve of claim 1 wherein the conduit comprises a valve outlet orifice having a fluid sealing element.

6. The bistable minivalve of claim 1 wherein the actuation surface is a membrane having a thickness of less than 100 micrometers.

7. The bistable minivalve of claim 1 wherein the actuator is magnetically coupled to the movable component to induce changes between the open state and the closed state.

8. A bistable minivalve comprising:
   a conduit for carrying a fluid;
   a movable component having an open state allowing fluid flow through the conduit and a closed state blocking fluid flow through the conduit;
   an actuator coupled to the movable component for controllably switching the movable component between the open state and the closed state; and
   a casing providing structural support for the conduit, the movable component, and the actuator;
   wherein, the movable component comprises:
   an actuation surface movably positioned in the conduit; and
   a bistable element attached to the actuation surface providing mechanical stability to the open and closed states of the movable component;
   wherein the bistable element comprises elastic buckling beams attached to opposite sides of the actuation surface;
   wherein the bistable element comprises C-clamps compressed to buckle the buckling beams.

9. The bistable minivalve of claim 8 wherein each of the buckling beams is bonded near endpoints to a substrate to induce buckling.

10. The bistable minivalve of claim 8 wherein the elastic buckling beams are attached at their midpoints to opposite sides of the actuation surface.

11. The bistable minivalve of claim 8 wherein the movable component comprises a sealing element attached to the actuation surface.

12. The bistable minivalve of claim 8 wherein the conduit comprises a valve outlet orifice having a fluid sealing element.

13. The bistable minivalve of claim 8 wherein the actuation surface is a membrane having a thickness of less than 100 micrometers.

14. The bistable minivalve of claim 8 wherein the actuator is magnetically coupled to the movable component to induce changes between the open state and the closed state.

15. A bistable minivalve comprising:
   a conduit for carrying a fluid;
   a movable component having an open state allowing fluid flow through the conduit and a closed state blocking fluid flow through the conduit;
   an actuator coupled to the movable component for controllably switching the movable component between the open state and the closed state; and
   a casing providing structural support for the conduit, the movable component, and the actuator;
   wherein the movable component comprises:
   an actuation surface movably positioned in the conduit; and
   a bistable element attached to the actuation surface providing mechanical stability to the open and closed states of the movable component;
   wherein the bistable element comprises elastic buckling beams attached to opposite sides of the actuation surface;

wherein each of the buckling beams comprises two material layers inducing buckling by shear stress.

16. The bistable minivalve of claim 15 wherein each of the buckling beams is bonded near endpoints to a substrate to induce buckling.

17. The bistable minivalve of claim 15 wherein the elastic buckling beams are attached at their midpoints to opposite sides of the actuation surface.

18. The bistable minivalve of claim 15 wherein the movable component comprises a sealing element attached to the actuation surface.

19. The bistable minivalve of claim 15 wherein the conduit comprises a valve outlet orifice having a fluid sealing element.

20. The bistable minivalve of claim 15 wherein the actuation surface is a membrane having a thickness of less than 100 micrometers.

21. The bistable minivalve of claim 15 wherein the actuator is magnetically coupled to the movable component to induce changes between the open state and the closed state.

* * * * *